US008787129B1

(12) United States Patent
Jin et al.

(10) Patent No.: US 8,787,129 B1
(45) Date of Patent: Jul. 22, 2014

(54) POLARIZATION ROTATOR FOR THERMALLY ASSISTED MAGNETIC RECORDING

(71) Applicant: Headway Technologies, Inc., Milpitas, CA (US)

(72) Inventors: Xuhui Jin, San Jose, CA (US);
Hiroyuki Ito, Sunnyvale, CA (US);
Yoshitaka Sasaki, Los Gatos, CA (US);
Shigeki Tanemura, Sunnyvale, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 13/785,280

(22) Filed: Mar. 5, 2013

(51) Int. Cl.
*G11B 11/00* (2006.01)

(52) U.S. Cl.
USPC ................................ 369/13.33; 369/13.13

(58) Field of Classification Search
CPC ............... G11B 2005/0021; G11B 2005/0032; G11B 5/314
USPC ................... 369/13.33, 13.13, 13.32, 13.17
See application file for complete search history.

(56) References Cited

U.S. PATENT DOCUMENTS

| | | | |
|---|---|---|---|
| 7,804,655 B2 | 9/2010 | Shimazawa et al. | |
| 8,116,034 B2 | 2/2012 | Komura et al. | |
| 8,179,747 B1 | 5/2012 | Mugino et al. | |
| 8,248,898 B2 | 8/2012 | Schreck et al. | |
| 8,270,791 B2 | 9/2012 | Komura et al. | |
| 8,315,129 B1 | 11/2012 | Komura et al. | |
| 2007/0165495 A1* | 7/2007 | Lee et al. ................... | 369/13.33 |
| 2010/0073817 A1 | 3/2010 | Takayama et al. | |
| 2011/0216635 A1 | 9/2011 | Matsumoto | |
| 2011/0292537 A1 | 12/2011 | Jin et al. | |
| 2013/0108212 A1* | 5/2013 | Peng et al. ..................... | 385/15 |
| 2013/0223196 A1* | 8/2013 | Gao et al. ................... | 369/13.24 |

FOREIGN PATENT DOCUMENTS

| | | |
|---|---|---|
| JP | 2010-088110 | 4/2010 |
| JP | 2011 220745 | 11/2011 |

OTHER PUBLICATIONS

High-efficiency Ultrasmall Polarization Converter in InP Membrane, Josselin Pello et al, Optics Letters, Sep. 1, 2012.*
Compact Polarization Mode Converter Monolithically Integrated Within a Semiconductor Laser, Bregenzer et al, Journal of Lightwave Technology, vol. 27, No. 14, Jul. 15, 2009.*
Co-pending U.S. Appl. No. 13/548,301, filed Jul. 13, 2012, "Hybrid Plasmon Generator Structure and Process," by Xuhui Jin et al., 38 pgs.

* cited by examiner

*Primary Examiner* — Tan X Dinh
(74) *Attorney, Agent, or Firm* — Saile Ackerman LLC; Stephen B. Ackerman

(57) ABSTRACT

A waveguide structure with a light polarization rotator section for converting transverse electric light from a TE light source to transverse magnetic light which is subsequently coupled to a plasmon generator (PG) is disclosed. Wavelengths above 800 nm are advantageously used to reduce resistive heating in the PG, and in adjacent cladding and write pole layers to improve the thermally assisted magnetic recording head lifetime. The light polarization rotator section has a length determined by TE LD light wavelength, and the effective mode index of the two orthogonal fundamental modes, and preferably has a symmetric structure including a sloped side with a 45 degree angle with respect to a bottom surface. A vertical side of the light polarization rotator section may be coplanar with sides of adjacent waveguide sections. Offsets to the cross-track width are used to improve symmetry for higher TE to TM polarization conversion efficiency.

25 Claims, 7 Drawing Sheets

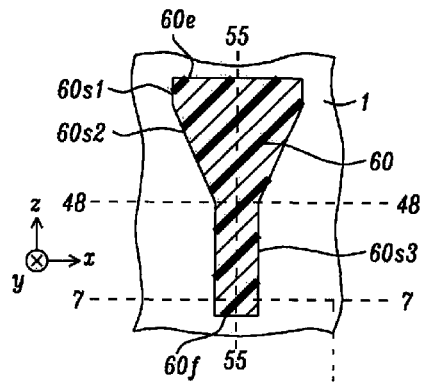 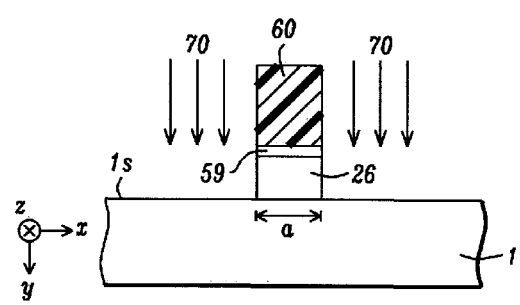
FIG. 8a    FIG. 8b
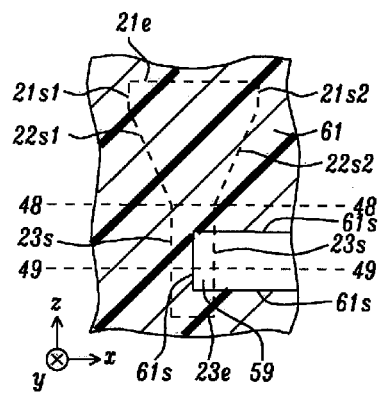 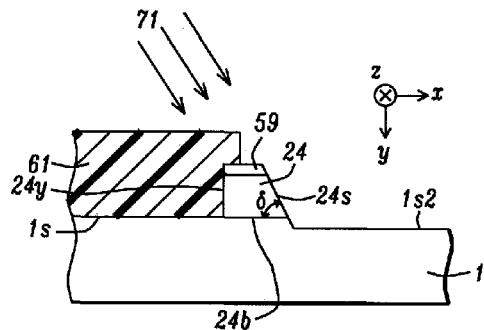
FIG. 9a    FIG. 9b
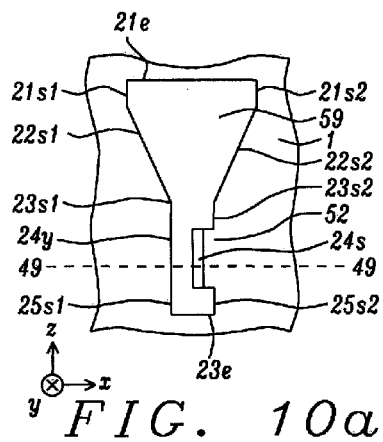 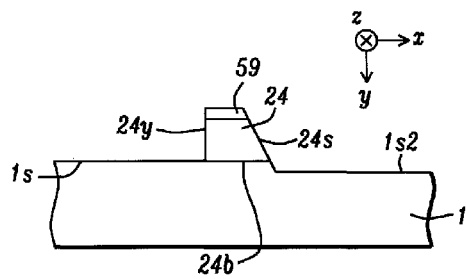
FIG. 10a    FIG. 10b

POLARIZATION ROTATOR FOR THERMALLY ASSISTED MAGNETIC RECORDING

RELATED PATENT APPLICATION

This application is related to U.S. Pat. No. 8,248,898, Ser. No. 13/548,301, filing date 7/13/12; both assigned to a common assignee, and is related to U.S. Pat. No. 7,804,655, all three herein incorporated by reference in their entirety.

TECHNICAL FIELD

The present disclosure relates to magnetic read/write heads based on thermally assisted magnetic recording (TAMR) and in particular to a TAMR head in which TE (transverse electric) light at wavelengths above 800 nm is polarized within a waveguide to TM (transverse magnetic) light that is useful for surface plasmon excitation thereby improving the reliability of a planar plasmon generator (PPG).

BACKGROUND

TAMR is expected to be one of the future generations of magnetic recording technologies that will enable recording at ~1-10 Tb/in$^2$ data densities. TAMR involves raising the temperature of media grains in a magnetic medium to near its Curie temperature where both of its coercivity and perpendicular anisotropy are significantly reduced and magnetic writing becomes easier to achieve even with weak write fields characteristic of small write heads in high recording density schemes. In TAMR, optical power from a light source mounted behind the recording head is transported by a waveguide and then converted into localized heating in a recording medium during a write process to temporarily reduce the field needed to switch the magnetizations of the medium grains. Thus, with a sharp temperature gradient of TAMR acting alone or in combination with a high magnetic field gradient, data storage density can be further improved with respect to current state of the art recording technology.

In FIG. 1a, an example of TAMR optical architecture is shown wherein laser light 8 from a laser diode (LD) 2 mounted on a slider by an end-fire butt coupling 3 is coupled to a waveguide and directed toward an ABS 7-7. A typical waveguide has a first S1 section 4 adjoining the laser diode, a tapered middle S2 section 5, and a narrow end S3 section 6 adjoining the ABS. The y-axis represents the down-track direction and the x-axis is the cross-track direction.

Referring to FIG. 1b, light energy 8 in the waveguide is further coupled to a plasmon generator (PG) micro structure 13 formed between waveguide section 6 and main pole 12. The waveguide is formed on a dielectric (cladding) layer 1 which also contains a read head sensor 11. The cladding layer is formed on a slider 10. The plasmon generator terminates at the ABS and confines plasmon energy 8a to a tiny optical spot 9s on the magnetic medium 9 thereby heating magnetic grains in the medium during a write process. Current technology uses TM LD light with a wavelength near 800 nm. Waveguide light is propagated toward the ABS in a TM polarization mode so that the surface plasmon of the PG can be excited through efficient coupling with the waveguide.

In FIG. 2, a cross-section of the waveguide S3 section 6 is depicted along the plane 45-45 in FIG. 1a. Typically, the S3 section has a rectangular shape with a width a in a cross-track direction and a height or thickness b in the down-track direction.

Although 1 Tb/in$^2$ areal density has been achieved with TAMR, the TAMR head suffers from a short lifetime which has been attributed to resistive heating in the head structure that degrades materials such as Au in the plasmon generator, alumina in the surrounding cladding layer, and FeCo and NiFe typically found in the writer pole. Although resistive heating may be reduced somewhat by designing an improved waveguide alignment scheme so that less power is required from the LD, substantial improvement in technology is still needed from other parts of the light architecture in the slider assembly. Therefore, it is important to optimize all aspects of the light architecture in order to fabricate a TAMR head with a substantial increase in lifetime that is required for commercial products.

SUMMARY

One objective of the present disclosure is to provide an improved waveguide in the light architecture of a slider assembly to enable a longer wavelength of LD light to be coupled to a plasmon generator and thereby significantly increase the lifetime of the TAMR head.

A second objective of the present disclosure is to provide an improved waveguide structure with a fabrication scheme that uses common processes so that a reproducible TAMR structure of the first objective can be realized.

These objectives are achieved in the present disclosure by a TAMR structure wherein TE light from a laser diode (LD) is directed into a back end of a waveguide and wherein the TE LD light is polarized to a TM light mode before reaching a front section of the waveguide and coupling to a plasmon generator (PG) where a surface plasmon mode is excited and propagated to the ABS. Thus, the waveguide receives TE light from a light source and then delivers a substantial portion of the input light energy in a TM mode by coupling to a near field device (PG). The PG may have a triangular shape at the ABS or a planar shape wherein a small rectangular non-noble or noble metal peg is exposed at the ABS and is connected to a recessed noble metal portion. The PG transforms TM light at wavelengths above 800 nm into plasmon energy and produces a near field at the ABS and on the recording media during a write process. The PG extends 0.5 to 2 microns from the ABS and according to one embodiment is positioned in a down-track direction from the main waveguide and is formed between a S3b waveguide sub-section and the main pole layer in the TAMR recording head.

According to one embodiment of the present disclosure, a main waveguide has a lengthwise dimension that extends from the ABS to a back end of a slider and is comprised of four sections from a top-down perspective wherein a first axis is a cross-track direction and a second axis represents a direction perpendicular to the ABS and towards the back end of the device. From an ABS view, there is a third axis in a down-track direction that is perpendicular to the first and second axes.

A first waveguide section (S1) has a rectangular shape from a top-down view with a first end at the back end of the slider, a second end opposite the first end and formed a first distance from the back end and along a first plane, and a first width in a cross-track direction between two sides. There is a second waveguide section (S2) having a tapered shape with a first end adjoining the second end of the first section at the first plane, a second end that is formed along a second plane that is parallel to the first plane, and two sides connecting the first and second ends of the second section. The second section has a widthwise dimension in the cross-track direction which gradually decreases along the light propagation direction toward the ABS. Thus, a second width of the second section along the second plane is substantially less than the first width along the first plane so that the beam is narrowed before reaching a third section of the waveguide. The third waveguide section is comprised of two sub-sections (S3a and S3b) that are separated by a fourth section S4. Each of the S3a and S3b sub-sections has the second width in the cross-track direction, and the same first thickness in a down-track direction as the S1 and S2 waveguide sections. Sub-section S3a adjoins the second plane at one end while an opposite end adjoins a first end of the S4 section. Sub-section S3b has one end at the ABS and a second end facing away from the ABS that adjoins a second end of the S4 section. A center plane formed perpendicular to the ABS passes through the S4 section and bisects the remaining waveguide sections with respect to the cross-track direction.

A key feature of the present disclosure is the S4 section which functions as a light polarizer wherein TE light that enters the first end along an interface with sub-section S3a is converted to TM light upon reaching the second end along an interface with sub-section S3b. Although the thickness of section S4 is preferably equivalent to the first thickness of sections S1, S2, S3a, and S3b, the width of section S4 may be modified to be less than the second width. According to one embodiment, there is a vertical side and a sloped side that connect planar top and bottom surfaces of the S4 section to form an irregular trapezoid shape from a cross-sectional view. From a cross-sectional view along the first end of section S4, or along a second end of section S4, the vertical side may be offset from adjacent sides of sub-sections S3a, S3b such that the vertical side is closer to the center plane than the S3a, S3b sides. The sloped side extends from an edge of the top surface of section S4 to an edge of the bottom S4 surface such that the sloped side and bottom surface preferably form an angle of about 45±1 degrees. The intersection of the sloped side and bottom surface of section S4 may be offset from adjacent S3a, S3b sides such that the sloped side is closer to the center plane than the S3a, S3b sides.

In an alternative embodiment, the S4 section may have a curved shape from a top-down view in which a first S4 sub-section is attached to the end of the S3a section opposite to the second plane and is formed substantially parallel to the ABS, and a third S4 sub-section is attached to the end of the S3b section opposite the ABS and is formed parallel to the first sub-section. A second or middle S4 sub-section is curved with a "C" shape and is connected to the ends of the first and third S4 sub-sections at a third distance from the waveguide center plane that bisects sections S1 and S2 and is perpendicular to the ABS.

The process sequence to fabricate the waveguide begins with a conventional series of steps wherein a waveguide material is deposited as a full film layer on a substrate that is a dielectric (cladding) layer, for example. Then a first photoresist layer is coated and patterned in the desired shape of the waveguide from a top-down view with the exception of the S4 section that is formed in subsequent steps. The photoresist pattern is transferred through the waveguide layer by an etch process and stops on a bottom cladding layer. Thereafter, the first photoresist layer is removed and a second photoresist layer is coated and patterned such that an opening is formed above a portion of waveguide between the S3a and S3b sub-sections. The opening uncovers a first side of the waveguide for a distance that corresponds to the desired lengthwise dimension of the S4 section along the second axis. A second etch is performed at an angle of 45 degrees to yield the sloped side on section S4 and an irregular trapezoid shape according to one embodiment.

After the second photoresist is removed, a second cladding layer is deposited on the bottom cladding layer and waveguide. Next, a chemical mechanical polish (CMP) process is employed to form a planar surface that comprises a top surface of the second cladding layer and a top surface of all sections S1, S2, S3a, S3b, and S4 of the waveguide. In one aspect, the waveguide fabrication sequence concludes here. According to an alternative embodiment wherein an offset is built in on one or both sides of section S4, a third photoresist layer is coated and patterned to generate a first trench opening over a first S4 side, and a second trench opening over the opposite (sloped) slide of section S4. In the following step, a vertical etch removes the original vertical side and forms a new vertical side at a first offset from the original position. The vertical etch also removes a portion of the section S4 sloped side to create a second offset from the original edge that represented the intersection of the sloped side and bottom surface.

According to one embodiment, the second offset forms a short vertical (fifth) side that connects the bottom S4 surface to the remaining portion of sloped side. In an alternative embodiment, the vertical etch forms a triangular shaped S4 section wherein the top planar S4 surface is entirely removed except for the tip of the triangle. The five sided and triangular shapes are highly symmetrical and allow essentially total conversion of TE light to TM light within section S4. Preferably, the length (L) of section S4 along the second axis direction is the half beating length of the two orthogonal fundamental modes determined by $L=\lambda/(2(n1-n2))$ where $\lambda$ is TE light wavelength, and n1 and n2 are the effective mode indices of the two orthogonal fundamental modes. A final process flow in the waveguide fabrication involves deposition of a dielectric layer to fill the first and second trenches followed by a second CMP process to form a planar top surface.

BRIEF DESCRIPTION OF THE DRAWINGS

FIG. 1b is a down-track cross-sectional view of the TAMR structure in FIG. 1a.

FIG. 2 is a cross-sectional view showing a rectangular shape of the narrow S3 section of waveguide in FIG. 1a.

FIG. 3b is a down-track cross-sectional view of the TAMR structure in FIG. 3a.

FIG. 7b is a down-track cross-sectional view of the TAMR structure in FIG. 7a.

FIGS. 8a-11a depict a series of process steps from a top-down view during the waveguide fabrication according to a first embodiment of the present disclosure.

FIGS. 8b-11b illustrate a series of process steps from a cross-sectional view of section S4 during the waveguide fabrication of the present disclosure.

DETAILED DESCRIPTION

Figure 1A:
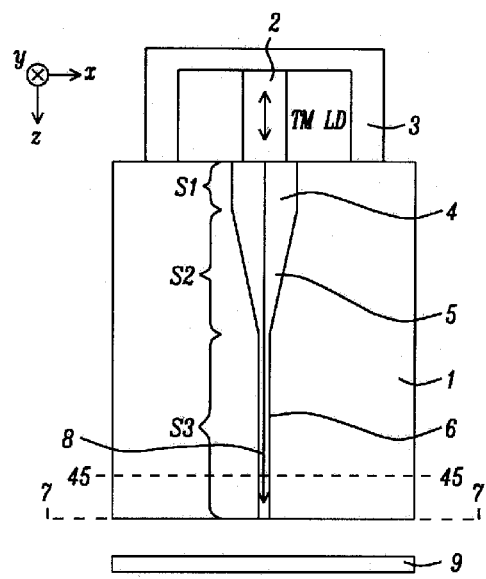
FIG. 1a is a top-down view of a conventional waveguide that is connected at a wide end to a TM laser diode (TM LD) and extends to a narrow end at an ABS.
Figure 1B:
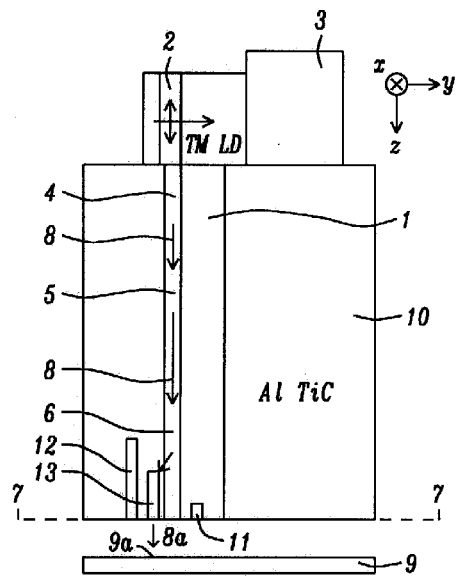
Figure 2:
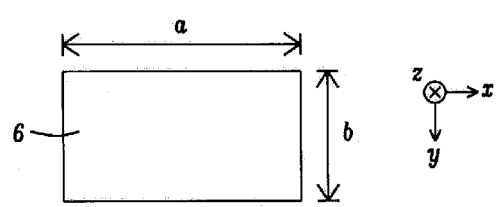

The present disclosure features a main waveguide in a TAMR structure wherein the waveguide has a portion of a narrow rectangular section near an air bearing surface (ABS) that is modified to a trapezoid or triangular shape to serve as a polarization rotator and convert TE light to TM light before the propagated light reaches an adjacent plasmon generator (PG) and excites a plasmon energy mode that is subsequently propagated to the ABS and onto a magnetic medium. Although only a main waveguide is pictured in the drawings, the present disclosure anticipates that alignment waveguides may be included adjacent to the main waveguide without sacrificing the benefits of the light architecture described herein. The main waveguide is also compatible with other plasmon generator structures in addition to the two types described herein. Top and bottom surfaces of TAMR components that include the main waveguide face either a down-track (y-axis) direction, or opposite to the down-track direction while sides face a cross-track (x-axis) direction. The z-axis in the drawings is a direction from the ABS toward a back end of the TAMR device and slider.

Figure 3A:
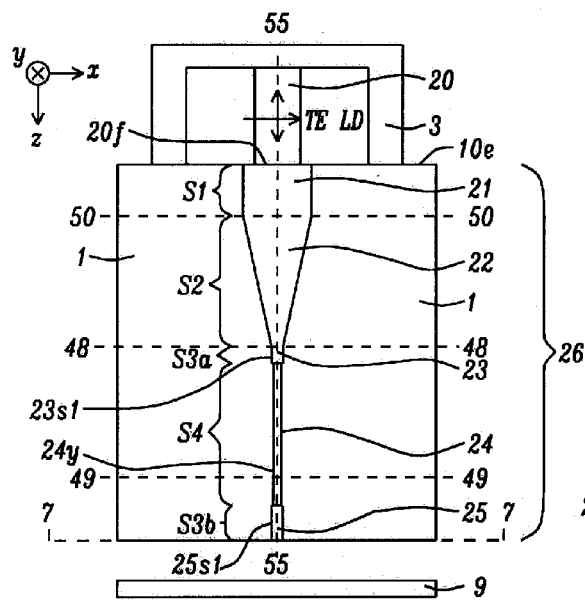
FIG. 3a is a top-down view of a first embodiment of present disclosure wherein a middle portion of a narrow waveguide section is replaced by a section S4 that converts TE light to TM light.

According to one embodiment of the present disclosure depicted from a top-down view in FIG. 3a where all TAMR layers above the waveguide have been removed, the main waveguide hereafter referred to as waveguide 26 is comprised of four sections which are a back end section S1, a tapered section S2, a narrow section that includes sub-sections S3a, S3b, and a narrow light polarization section S4 formed between sub-section S3a and sub-section S3b. The waveguide includes a core made of $Ta_2O_5$, $HfO_2$, Si, or the like with a high refractive index (RI) and is surrounded by one or more cladding layers comprised of a dielectric material such as alumina or silicon oxide. It is important that the RI of the cladding material is less than the RI of the core in order to maintain light transmission through the core and facilitate efficient light propagation to the ABS.

Section S1 21 is a wide rectangular section with one end at the back end 10e of the slider and a second end formed along a plane 50-50 which is 0 to 50 microns from the back end. Section S1 sides are preferably formed along the z-axis direction. A TE laser diode (TE LD) 20 that emits wavelengths in the range of 760 to 1000 nm is attached to a submount 3 and affixed to the back end 10e of the slider such that a front side 20f of the TE LD faces section S1. A preferred end-fire butt coupling structure for a LD and submount was previously disclosed in related U.S. Pat. No. 7,804,655. As a result of TE light directed through front side 20f which adjoins an end of section S1, TE light coupling occurs within section S1 with light propagation toward the ABS.

It should be understood that TM laser diodes are currently able to provide light at wavelengths around 800 nm but are not readily available for wavelengths above 830 nm. An advantage of the present disclosure is that a TE LD is employed that produces higher wavelengths including 850, 905, 940, 970, and 980 nm. Furthermore, a TE LD is normally less expensive to construct than a TM LD. As explained later, the longer wavelengths lead to less resistive heating in the PG and longer lifetimes of the TAMR recording head due to a reduction in thermal degradation of components. Different wavelengths between 800 nm and 1000 nm may be selected to provide a compromise between longer TAMR lifetime (less resistive heating) and less efficient heating of the magnetic media by the plasmon mode as the wavelength is increased significantly above 800 nm.

Section S2 22 is tapered such that the width in a cross-track direction is progressively smaller as the distance to the ABS 7-7 decreases thereby scaling down the beam size as the TE light propagates down the waveguide 26. Thus, the first width of section S2 at a first end along plane 50-50 is greater than a second width at a second end formed along the plane 48-48. Note that the first end of section S2 adjoins the second end of section S1 along the plane 50-50 while the second end of section S2 adjoins an end of sub-section S3a 23 along plane 48-48. Planes 48-48 and 50-50 are aligned parallel to the ABS. The lengthwise dimension of section S2 along the z-axis direction is 30 to 100 microns.

Sub-section S3a 23 has a first end along plane 48-48 and extends a distance of 0 to 20 microns along the z-axis to an end of section S4 24 that faces away from the ABS. Preferably, sub-section S3a has a second width between two vertical sides that are aligned along a z-axis direction. Sub-section S3b 25 also has a second width between two vertical sides which extend from one end at the ABS 7-7 to an opposite end that abuts an end of section S4 facing the ABS. The lengthwise dimension of sub-section S3b in a z-axis direction is from 2 to 50 microns.

Figure 4A:
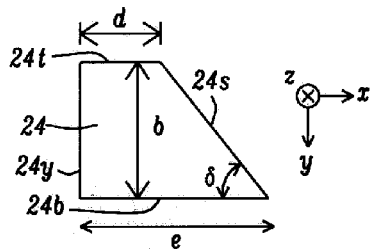
FIG. 4a is a cross-sectional view of section S4 in FIG. 3a showing an irregular trapezoid shape with one sloped side and one vertical side.

A key feature of waveguide 26 is section S4 24 wherein TE light enters an end adjoining sub-section S3a 23 and is converted by polarization rotation to TM light before reaching sub-section S3b 25. According to first embodiment of the present disclosure, section S4 has a cross-sectional shape (along the cross-track direction in plane 49-49) which is an irregular trapezoid as depicted in FIG. 4a. A top surface 24t is preferably coplanar with the top surfaces (not shown) of sections S1, S2, S3a, and S3b, and has a width d in a cross-track direction where d is less than e which is the width of the bottom surface 24b. There is a vertical side 24y that is coplanar with sides 23s1, 25s1 in the adjoining sub-sections S3a, S3b (FIG. 3a). In an alternative embodiment described later, the vertical side may be replaced by a new vertical side 24y2 that is offset from the sides of sub-sections S3a, S3b and formed closer to the center plane 55-55 (aligned perpendicular to ABS and bisecting sections S1, S2, S3a, and S3b) than the first embodiment wherein sides 23s1, 25s1, and 24y are coplanar. As indicated in FIG. 4a, sloped side 24s is connected to top surface 24t and intersects with the bottom surface to preferably form an angle δ of 45±1 degrees to provide the most efficient polarization of TE light to TM light. Preferably, bottom surface 24b of section S4 is coplanar with the bottom surfaces (not shown) of sections S1, S2, S3a, and S3b.

Figure 3B:
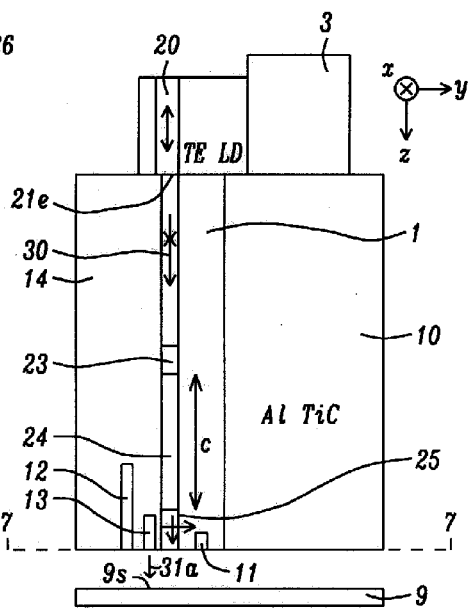

As a result of the trapezoid shape in section S4, the two fundamental transmission modes are tilted at approximately +45 degrees and −45 degrees with respect to top and bottom surfaces 24t, 24b. Due to the non-symmetrical shape of the irregular trapezoid, the two fundamental modes may not be aligned exactly orthogonal to each other which means polarization to TM light is not necessarily 100% efficient. When TE polarized light enters section S4, the two orthogonal modes are excited and start to beat each other. After a half beating length that is determined by the wavelength λ, the two modes will have a 180 degree phase shift and recombine to become TM polarized light. In other words, the lengthwise dimension of section S4 shown as c in FIG. 3b is preferably equal to the half beating length of the two orthogonal fundamental modes and is expressed as $L=\lambda/[2(n1-n2)]$ where is the wavelength of the LD light in free space, n1 is an effective mode index of a first orthogonal mode, and n2 is an effective mode index of a second orthogonal mode. For example, with λ=915 nm, an electric field tilted at +45 degrees and −45 degrees in the two fundamental modes (determined by 5=45 degrees), and with n1=1.76827 and n2=1.74239, then L is equal to 17.678 microns. Values for c between 0.9 L and 1.1 L are acceptable since a high conversion efficiency of TE light to TM light is still achieved in this range.

Figure 5A:
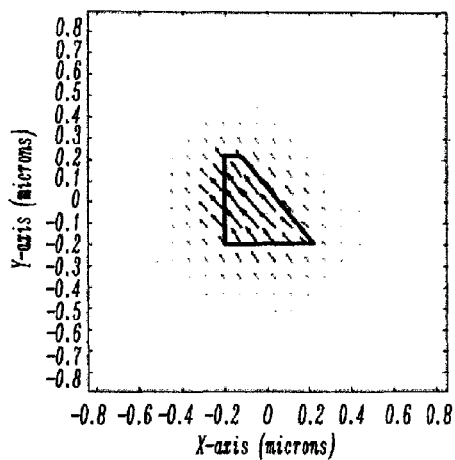
FIGS. 5a-5b are vector electric field distributions of the two orthogonal fundamental modes (+/−45 degree tilted) overlaid on a cross-section of the waveguide section S4 according to an embodiment of the present disclosure.
Figure 5B:
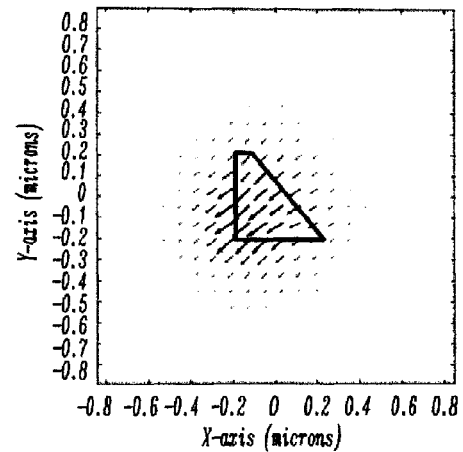

Referring to FIG. 5a, a vector electric field distribution of a first fundamental mode with a +45 degree tilt is shown wherein the vectors within the trapezoid shape of waveguide section S4 are pointing up and to the left (substantially parallel to the sloped side). In FIG. 5b, the vector field distribution of the second fundamental mode with a −45 degree tilt is illustrated and has vectors pointing down and to the left (away from the sloped side of the trapezoid).

Referring to FIG. 3b, a down-track cross-sectional view of a TAMR structure of the present disclosure is shown. The submount 3 is affixed to a back end of AlTiC substrate 10 and is used to support the overlying TE LD 20. TE polarized light 30 from the TE LD transits a back end portion of the waveguide and a middle section including section S3a 23, and then enters section S4 24. TM polarized light 31 exits section S4 at an end that faces the ABS 7-7. A portion of the TM polarized light continues to the ABS but a substantial portion of the TM light is coupled to the adjacent PG 13 where it excites a plasmon mode. The plasmon energy mode 31a propagates to the ABS and emerges from the PG to focus on a localized spot 9s on magnetic medium 9 during a write process. One or more alignment waveguides (not shown) may be employed to adjust the position of the LD during a LD to slider mounting process.

A read head portion of the TAMR head is formed between the substrate 10 and waveguide and includes a sensor element 11. The PG 13 is formed between waveguide section S3b 25 and a main pole layer 12 in the write head portion of the TAMR recording head and extends a distance of about 0.5 to 2 microns in a z-axis direction (perpendicular to ABS). It is important that the length of section S3b is greater than the PG length in the z-axis direction to afford maximum coupling of TM mode 31 to the plasmon energy mode 31a. Dielectric (top cladding) layer 14 is made of alumina, silicon oxide, silicon nitride, or the like.

Figure 4B:
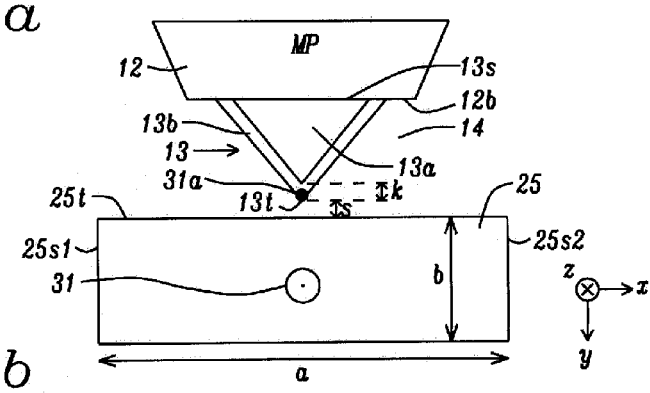
FIG. 4b is an ABS view of the TAMR structure in FIGS. 3a-3b with a triangular shaped PG.

Referring to FIG. 4b, a cross-sectional view of the TAMR structure in FIG. 3b is shown from the ABS according to an embodiment wherein the PG has a triangle shape also known as an edge plasmon generator (EPG). Sub-section S3b 25 and sub-section S3a (not shown) have a rectangular shape with second width a in a cross-track direction and a thickness b in a down-track direction. The direction of TM polarized light 31 that was not coupled to the PG 13 is into the plane of the paper. According to one embodiment, top surface 25t of section S3b is separated from the PG 13 by a gap distance s of about 10 to 100 nm. The PG has a triangle shape to couple the plasmon mode 31a concentrated at tip 13t to the TM light from the waveguide section S3b. In one aspect, PG 13 comprises a magnetic core 13a and a plasmon layer 13b having a thickness k on two sides which converge at tip 13t facing waveguide section 25. Magnetic core 13a and main pole layer 12 may be comprised of one or more of Co, Fe, Ni, and B, or alloys thereof. Moreover, the main pole and magnetic core 13a may have the same composition. Plasmon layer 13b is preferably made of Au and/or Ag with a thickness k from about 10 to 100 nm and extends in a z-axis (lengthwise) direction perpendicular to the ABS along the entire length of the PG. In a preferred embodiment, plasmon layer 13b includes two sides which converge at a vertex or tip 13t to form a "V" shape and overlay on the magnetic core 13a which has a third side 13s facing the main pole layer. The third side 13s may be adjoined to a bottom surface 12b of the main pole layer and is then considered part of the leading side of the main pole layer.

It should be understood that the main pole (and TAMR head) move opposite to the y-direction or down-track direction during a write process. Furthermore, the waveguide structure of the present disclosure may be employed with any TAMR head and is not dependent on a specific configuration for the main pole layer or near field device (PG). For example, the TAMR components may sequentially cross over a magnetic medium location in the order of main pole followed by PG and then the waveguide structure, or in the reverse order.

The plasmon mode 31a is produced by radiative coupling with optical frequency electromagnetic radiation (TM light 31 emitted from section S4 into section S3b) and is transmitted toward the ABS within the plasmon layer 13b while the magnetic core 13a concentrates magnetic flux close to the heating point of the PG and enhances the magnetic field (not shown) at the magnetic medium heating location during writing. Thus, the PG 13 effectively becomes an extension of the main pole and generates a magnetic field whose maximum gradient overlaps the magnetic medium region being heated by edge plasmons produced in the plasmon layer 13b. The close overlap improves the effectiveness of a magnetic field from the write pole in changing local magnetization of the magnetic medium so that magnetic writing is greatly enhanced and can be confined to small surface areas. The gap between tip 13t and waveguide sub-section S3b 25 is preferably filled with a dielectric layer 14 comprised of silicon oxide, alumina, silicon oxynitride, silicon nitride, or $MgF_2$ to optimize light coupling between sub-section S3b and PG 13.

Figure 4C:
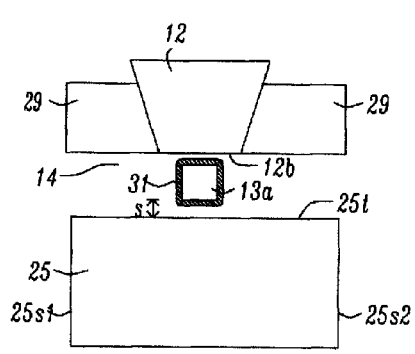
FIG. 4c is an ABS view of a TAMR structure with a rectangular peg shaped PG according to an embodiment of the present disclosure.

Referring to FIG. 4c, a second embodiment of a PG according to the present disclosure is depicted that relates to a so-called planar plasmon generator (PPG) and was previously disclosed in related application Ser. No. 13/548,301. In particular, the EPG shape in the previous embodiment is replaced in part by a small rectangular or square peg 13a at the ABS that is surrounded by plasmon mode 31a. Other features are retained from the EPG embodiment including the gap distance s and the gap layer 14. Heat sinks 29 may be included on opposite sides of the main pole layer 12 to minimize dissipate resistive heating.

Figure 4D:
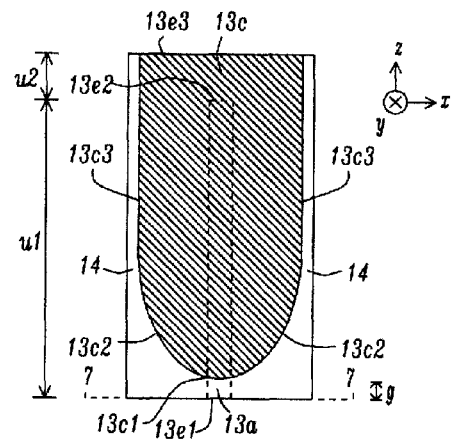
FIG. 4d is a top-down view of the PG in FIG. 4c that shows a recessed parabola portion of the PG.

From a top-down view in FIG. 4d, the PG structure of the second embodiment includes a second layer 13c that overlays on the peg layer 13a and is recessed a distance g from the ABS 7-7. The peg layer is made of a first metal that is selected from Ru, Cr, Pd, Pt, Ti, W, Ta, Fe, Co, Ni, or alloys thereof for low atom mobility, high thermal stability, good mechanical hardness, and good adhesion to surrounding dielectric layers. In an alternative embodiment, the peg layer is comprised of a metal nitride such as ZrN, HfN, or TiN. The bulk of the PG structure is the second layer 13c that has a greater width in the cross-track direction than peg layer 13a. The second layer is comprised of a second metal that is preferably Au, Cu, Ag, or an alloy thereof for good optical efficiency. In one aspect, the second layer 13c has a parabolic shape wherein straight sides 13c3 at the back end of the slider are connected to curved sides 13c2 which terminate at a tip 13c1 that is aligned above peg layer 13a at the recessed distance mentioned previously. A side 13c2 may connect with a side 13c3 at a distance from the ABS that is less than or greater than the lengthwise dimension u1 for the peg layer between a first end 13e1 at the ABS and a second end 13e2. Length u2 is the distance between the second end of the peg layer and the back end 13e3 of second layer 13c.

Figure 4E:
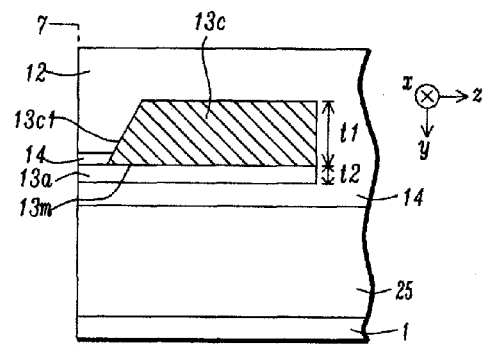
FIG. 4e is a cross-sectional view of the TAMR structure in FIG. 4c.

Referring to FIG. 4e, a cross-sectional view is shown along a plane that bisects each of the first and second PG layers along the z-axis direction. In the exemplary embodiment, second layer 13c has a greater thickness t1 in the down-track direction than the thickness t2 of first layer 13a. Front end 13c1 of the second layer may be sloped so that a top surface 13s is recessed a greater distance from the ABS 7-7 than a bottom surface 13m which adjoins layer 13a. Top surface 13s adjoins the main pole layer 12.

Figure 6A:
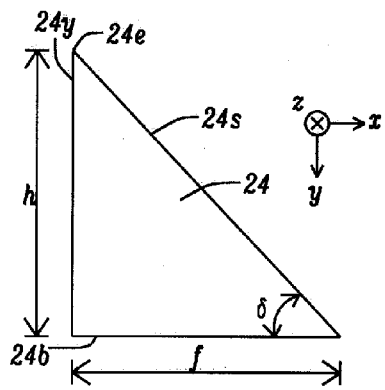
FIG. 6a is a cross-sectional view of section S4 in FIG. 3a showing a triangular shape.

Referring to FIG. 6a, section S4 24 is shown with cross-sectional shape according to a second embodiment of the present disclosure. In this case, section S4 is a triangle with a vertical side 24y having a thickness h that may be equal to or less than b in the first embodiment. As mentioned previously, side 24y may be formed coplanar with sides 23s1, 25s1 of adjacent sub-sections S3a, S3b (FIG. 3a), respectively, or the vertical side may be offset from the adjacent sides 23s1, 25s1 according to an alternative embodiment. Bottom surface 24b of section S4 has a width f in the cross-track direction where f is equal to or less than second width a. The sloped third side 24s of the triangle intersects with the bottom surface at the preferred angle δ of 45±1 degrees. It should be understood that when δ is equal to 45 degrees, the two orthogonal fundamental modes are tilted at +45 degrees and −45 degrees with respect to bottom surface 24b thereby enabling a complete rotation of TE light to TM light. With a δ angle unequal to 45 degrees, there will be less than 100% polarization of TE light which means a combination of TE and TM light will exit an end of section S4 that adjoins sub-section S3b 25. In other words, a symmetrical shape for section S4 such as a triangle where vertical side 24y has an equal length to bottom surface 24b (h=f) delivers the highest efficiency of light polarization conversion. In this embodiment, the edge 24e formed by the intersection of vertical side 24y with sloped side 24s represents a top surface of section S4.

Figure 6B:
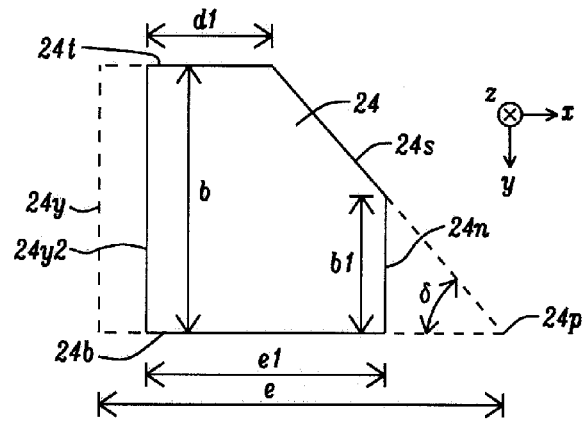
FIG. 6b is a cross-sectional view of section S4 with a five sided shape according to alternative embodiments of the present disclosure.

Referring to FIG. 6b, a cross-sectional shape of section S4 24 is shown according to a third embodiment wherein features of the trapezoid shape are retained from the first embodiment except for a portion of the bottom surface 24t and sloped side 24s that are shortened so that they no longer meet at an intersection point 24p. Instead, the bottom surface is shortened to be less than e and a fifth side 24n having height b1 is added to connect an end of side 24s with an end of bottom surface 24t. Thus, an end of sloped side 24s has a first offset from point 24p to the intersection with fifth side 24n. Furthermore, original vertical side 24y may be replaced by a new vertical side 24y2 that represents a second offset according to a method of the present disclosure. As a result, the width of top surface 24t is reduced to d1 and the bottom surface 24b is shortened to e1. The new fifth side is parallel to original vertical side 24y. Preferably, width d1 of top surface 24t equals height b1 of fifth (vertical) side 24n, and height b of vertical side 24y2 equals width e1 of bottom surface 24b to give a symmetrical shape for section S4 which enables essentially complete or 100% polarization of TE light to TM light similar to the efficiency of triangle shape in FIG. 6a. Note that width e may be equal to or less than the second width a in adjacent sub-sections 23, 25.

Figure 7A:
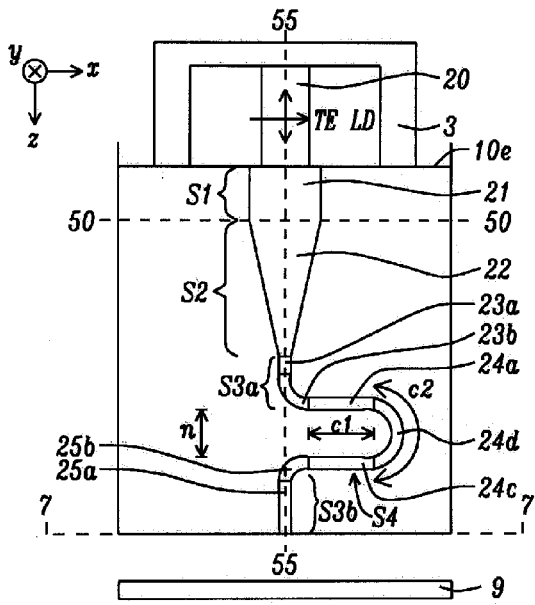
FIG. 7a is a top-down view of a second embodiment of the present disclosure wherein the waveguide section S4 has a curved shape.

In FIG. 7a, a top-down view is shown of another embodiment of the present disclosure that retains all of the features of the first embodiment (FIG. 3a) with the exception of section S4 and sub-sections S3a, S3b which now include a curved component. All TAMR layers above the waveguide are removed to provide an unobstructed view of the top surface of the waveguide. In particular, section S4 is comprised of two straight sub-sections 24a, 24c formed parallel to each other and aligned perpendicular to the center plane 55-55, and a curved sub-section 24d formed between sub-sections 24a, 24c. Each of the straight sub-sections has a length c1 which means the total length of section S4 is (2c1+c2) where c2 is the length of the curved sub-section. As a result of the curvature in the polarization rotator section S4, a greater length of section S4 is achieved to accommodate longer TE light wavelengths without increasing the z-axis length of the waveguide along center plane 55 between the ABS 7-7 and the back end of section 51 thereby maintaining a high areal density of the TAMR devices on each substrate during the fabrication sequence. It should be understood that each of the sub-sections 24a, 24c, 24d has the same cross-sectional width, thickness, and shape as described in one of the three embodiments represented in FIG. 4a, FIG. 6a, and FIG. 6b. The spacing n between the two straight sub-sections is preferably at least 8 microns to allow curved sub-section 24d to be fabricated in a reproducible manner.

Preferably, sub-section S3a is comprised of a straight portion 23a and a curved portion 23b wherein one end of the straight portion connects to an end of section S2, and an opposite end which faces the ABS adjoins a first end of curved portion 23b. A second end of curved portion 23b adjoins an end of straight sub-section 24a that faces the center plane 55-55.

Sub-section S3b is comprised of a straight portion 25a and a curved portion 25b wherein one end of the straight portion is formed at the ABS 7-7, and an opposite end adjoins a first end of the curved portion 25b. A second end of curved portion 25b adjoins an end of straight sub-section 24c that faces the center plane 55-55.

Figure 7B:
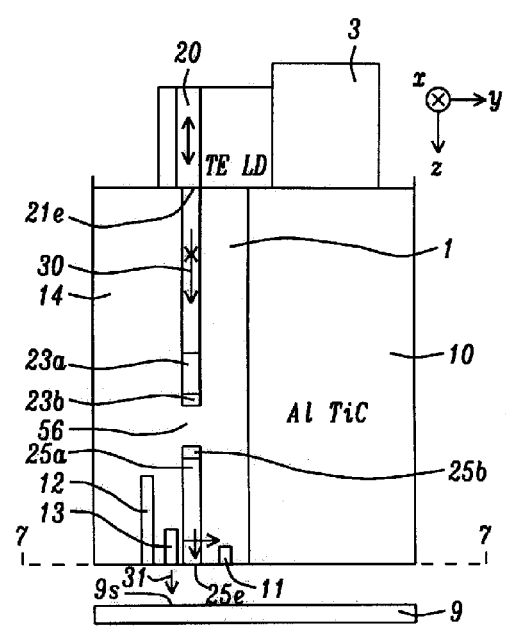

Referring to FIG. 7b, a down-track cross-sectional view is depicted of the TAMR recording head including the waveguide structure from FIG. 7a. The view is along the center plane 55-55. All of the features from the previous embodiment represented in FIG. 3b are retained except for the waveguide where there is a gap 56 between S3a curved portion 23b and S3b curved portion 25b. According to one aspect of the present disclosure, dielectric layer 14 fills the gap 56 previously occupied by section S4 which is now behind the plane of the paper.

The present disclosure also encompasses a method of making a waveguide structure with a polarization rotator component as illustrated in FIGS. 8-15 wherein the waveguide has a linear section S4 as represented in FIG. 3a. Referring to the top-down view in FIG. 8a, a waveguide layer and a hard mask such as Ta or the like are successively deposited on dielectric layer 1 also known as a cladding layer. Then, a first photoresist layer 60 is coated and patterned by a photolithography technique to produce a photoresist pattern in the desired shape of the subsequently formed waveguide structure. Therefore, a first end 60e of the photoresist pattern is formed directly above the eventual end of waveguide section S1 while sides 60s1 are formed above the intended sides of section S1. Likewise, photoresist sides 60s2 will determine the location of the section S2 sides while sides 60s3 will determine the location of section S3a, S3b sides according to a first embodiment (FIG. 3a) wherein all sections are formed along a center plane 55-55 that bisects sections S1, S2, S3a, and S3b. Note that photoresist end 60f is not formed directly above the eventual plane of the ABS 7-7 since a lapping process at the end of the TAMR recording head fabrication sequence will remove the portion of slider between end 60f and the ABS. At this point, there is still a single third section between plane 48-48 and end 60f. Sub-sections S3a, S3b will be defined after a subsequent angled etch process generates a sloped side as will be described later with respect to FIG. 9b.

In a cross-sectional view in FIG. 8b taken along plane 48-48, a reactive ion etch (RIE) or ion beam etch (IBE) with ions 70 directed perpendicular to surface 1s of dielectric layer 1 is employed to transfer the shape of photoresist layer 60 through hard mask 59 and through waveguide layer 26. As a result, the shape of the first photoresist layer is essentially reproduced in the hard mask and waveguide layers. An intermediate waveguide structure is produced with sections S1 and S2 (not shown) in their final form. The single third section between plane 48-48 and end 60f has a uniform second width a in a cross-track direction.

Referring to FIG. 9a, the first photoresist layer is stripped by a conventional method. Next, a second photoresist layer 61 is coated on cladding layer 1 and on hard mask 59. An opening is formed by a photolithography process to generate sides 61s in the second photoresist layer wherein the sides uncover a portion of cladding layer 1 and a portion of third section side 23s between side 22s2 in section S2 and third section end 23e. The opposite side 23s of the third section between side 22s1 and end 23e remains covered by the second photoresist and will become the vertical side 24y in section S4, and sides 23s1, 25s1 in sub-sections S3a, S3b, respectively, in the finished waveguide structure. Moreover, section S2 sides 22s1, 22s2 as well as section S1 end 21e and sides 21s1, 21s2 remain covered by the second photoresist layer. The distance in the z-axis direction between two sides 61s aligned in a cross-track direction determines section S4 length c in the finished waveguide.

Referring to FIG. 9b, a cross-sectional view is taken along the plane 49-49 in FIG. 9a and shows a second RIE or IBE process wherein ions 71 are directed toward exposed surface 1s on cladding layer 1 at an angle that corresponds to the desired angle δ between sloped side 24s and bottom surface 24b in section S4. The second etch process removes a portion of hard mask 59 opposite to vertical side 24y and forms sloped side 24s thereby defining section S4 24. According to a first embodiment where vertical side 24y is coplanar with adjacent sides of sub-sections S3a, S3b, the cross-sectional shape of section S4 in FIG. 9b has its final form. On the other hand, in alternative embodiments wherein offsets for sides 24y, 24s are built into section S4, then additional process steps including a third etch process are necessary as illustrated in FIGS. 12-15. A portion of top surface 1s may be removed by ions 71 to generate a new top surface 1s2. The portion of top surface 1s covered by second photoresist layer 61 is unaffected by the second RIE or IBE process.

Referring to the top-down view in FIG. 10a, the second photoresist layer is removed by a conventional method to uncover sloped side 24s in section S4 and the entire top surface of hard mask 59. Sides 21s1, 21s2 and end 21e are indicated for section S1 as well as sides 22s1, 22s2 for section S2, sides 23s1, 23s2 for sub-section S3a, and sides 25s1, 25s2 for sub-section S3b. As a result of the second etch process, there is typically a gap 52 formed between sub-sections S3a and S3b along sloped side 24s. However, in an alternative embodiment, side 24s may have a greater cross-track width along the x-axis and terminate along a plane (not shown) which is coplanar with sides 23s2, 25s2. End 23e will be replaced with a new end 25e after a subsequent lapping process determines the placement of the ABS.

FIG. 10b is a cross-sectional view of section S4 24 along the plane 49-49 in FIG. 10a. Hard mask 59 remains on a top surface between vertical side 24y and sloped side 24s.

Figure 11A:
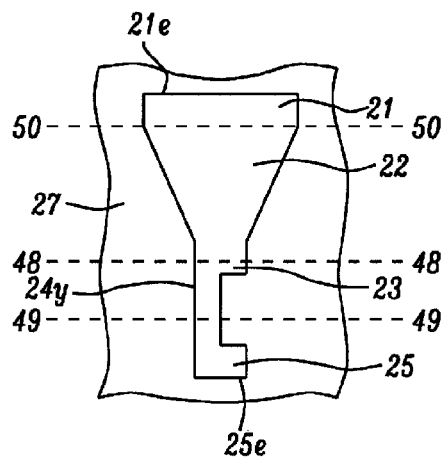

In FIG. 11a, a top-down view of the waveguide structure is depicted after a dielectric layer 27 is deposited on hard mask 59 and on cladding layer 1, and then a chemical mechanical polish (CMP) process is used to remove the hard mask layer and stop on a top surface of the waveguide. The dielectric layer 27 may be comprised of the same material as in cladding layer 1 or is made of a different dielectric material that has a lower refractive index than that of the waveguide sections 21-25. Plane 50-50 (see FIG. 3a) is also shown and separates waveguide section S1 21 from section S2 22. Plane 48-48, as described previously, separates section S2 from sub-section S3a 23.

Figure 11B:
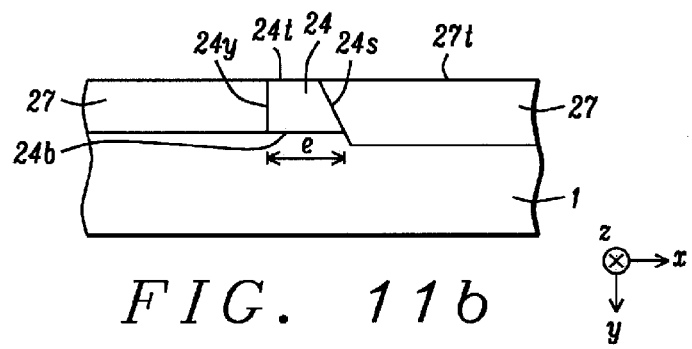

FIG. 11b is a cross-sectional view of section S4 along the plane 49-49 in FIG. 11a and shows that the sloped side 24s is covered by dielectric layer 27. A top surface 24t of section S4 24 is exposed along with the top surfaces of other waveguide sections (not shown) and is coplanar with a top surface 27t of the adjacent dielectric layer. At this point, the waveguide structure is finished according to the first embodiment depicted in FIG. 3a and FIG. 4a where side 23s1 of sub-section S3a and side 25s1 of sub-section S3b are formed coplanar with vertical side 24y.

Figure 12:
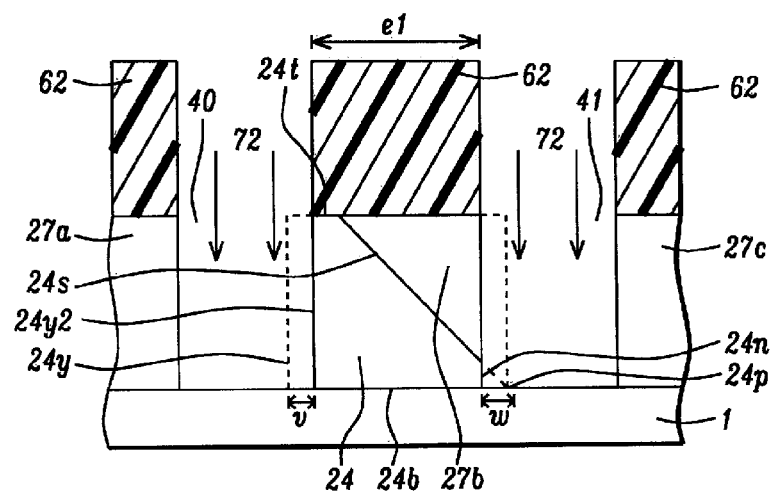
FIGS. 12-14 are cross-sectional views showing a series of steps that are used to form an offset on each side of the waveguide section S4 according to an embodiment of the present disclosure.

Referring to FIG. 12, a first step in the process sequence to build offsets along each side of section S4 24 according to an alternative embodiment is shown. A photoresist layer 62 is coated on the top surface of dielectric layer 27 and on the waveguide including section S4 24. The photoresist layer is patterned by a conventional photolithography technique to generate an opening 40 above vertical side 24y, and an opening 41 above a lower portion of sloped side 24s that includes the intersection edge 24p along bottom surface 24b. There is a width e1 in the cross-track (x-axis) direction between the two openings. In the following step, a third etch process, where ions 72 are directed perpendicular to the top surface of cladding layer 1, is employed to transfer the openings 40, 41 through a portion of S4 section 24 and through adjoining regions of dielectric layer 27 before stopping on the cladding layer. The spacing e1 and alignment of the photoresist pattern above section S4 is critical in determining the size of the first offset w which shortens sloped side 24s, and the size of the second offset v that removes original side 24y and forms a new vertical side 24y2 that is closer to sloped side 24s. The dashed lines are used to indicate the regions of section S4 removed by the third etch process.

According to a preferred embodiment, opening 41 has a width in the x-axis direction that is greater than w, and opening 40 has a width in the x-axis direction that is greater than v. The first offset w may be in the range of 0 to 0.2 microns and the second offset v may be from 0 to 0.2 microns. There are portions 27a, 27c of the dielectric layer opposite vertical side 24y2 and side 24n, respectively. There is also a portion 27b of the dielectric layer remaining on sloped side 24s.

Figure 13:
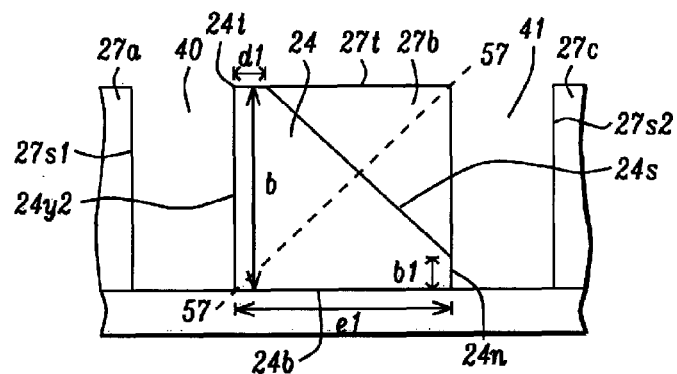

Referring to FIG. 13, the photoresist layer 62 is removed to expose a top surface 27t on dielectric layer portions 27a-27c and section S4 top surface 24t. Note that a portion of dielectric layer 27 (identified as section 27c) not formed above section S4 was etched to produce a sidewall 27s2 facing the new fifth side 24n which connects a lower end of sloped side 24s with bottom surface 24b. On the opposite side of section S4, another portion of the dielectric layer (shown as section 27a)

was removed to form opening 40 and a sidewall 27s1 facing the new vertical side 24y2. There is now a width d1 in the x-axis direction at the top surface of section S4. Preferably, b1=d1 and e1=b so that section S4 is symmetric about a plane 57-57 that bisects sloped side 24s and passes through the intersection of bottom surface 24b and vertical side 24y2.

Figure 14:
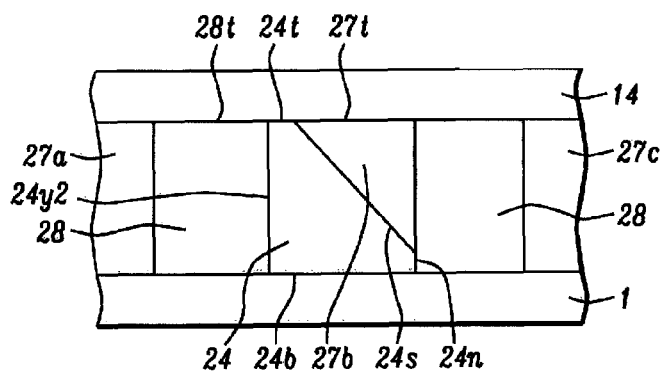

Referring to FIG. 14, a second dielectric layer 28 is deposited to fill openings 40, 41 and cover the top surfaces 24t, 27t. Then a second CMP process is used to form a top surface 28t on the second dielectric layer which is coplanar with top surfaces 24t, 27t. In one aspect, the second dielectric layer may be comprised of a different material than the first dielectric layer. For example, first dielectric layer sections 27a-27c may be made of silicon dioxide while second dielectric layer 28 is comprised of alumina. In an alternative embodiment, the first dielectric layer, second dielectric layer, and cladding layer 1 may all be comprised of the same material which is one of alumina, silicon oxide, or silicon nitride. In yet another embodiment, first and second dielectric layers also known as side cladding layers are made of silicon oxide and the bottom cladding layer 1 is made of alumina. Thereafter, a third dielectric layer 14 also known as a top cladding layer is deposited on the top surfaces 24t, 27t, 28t and may be planarized with a subsequent CMP process. Conventional methods are then used to form the remainder of the TAMR head including a PG and main pole layer on the third dielectric layer. A final step involves a lapping process to form an ABS 7-7 as shown in FIGS. 3a, 3b.

Figure 15:
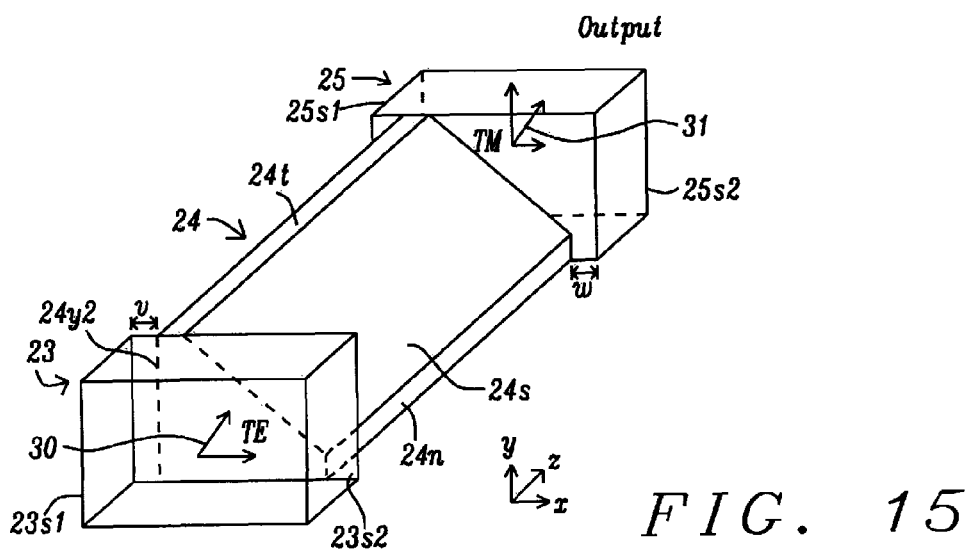
FIG. 15 is an oblique view of waveguide section S4 formed with offsets from the vertical sides of rectangular shaped sub-section S3a and sub-section S3b according to an embodiment of the present disclosure.

In FIG. 15, an oblique view of the finished waveguide sub-sections 23 (S3a), 25 (S3b), and section S4 24 is shown with the adjacent dielectric layers removed in order to clearly illustrate the first offset w of side 24n from adjacent sides 23s2, 25s2, and the second offset v of vertical side 24y2 from sides 23s1, 25s1. Propagation of light from the TE LD is along the z-axis such that the TE mode 30 enters section 23, and then enters section 25 as the TM mode after polarization rotation conversion occurs within section S4.

The present disclosure provides an advantage over the prior art in that it enables a lower cost TE LD to replace a TM LD in a waveguide scheme. In addition, there is more flexibility in utilizing wavelengths in the 800 to 1000 nm range since a TM LD is currently not available for wavelengths above 830 nm. The longer wavelengths are beneficial in significantly reducing resistive heating in the writer pole, PG, and cladding layers thereby improving reliability and increasing the useful lifetime of a TAMR head. The polarization rotator section S4 is readily fabricated with existing tools and process methods.

While the present disclosure has been particularly shown and described with reference to, the preferred embodiment thereof, it will be understood by those skilled in the art that various changes in form and details may be made without departing from the spirit and scope of this disclosure.

We claim:

1. A waveguide in a thermally assisted magnetic recording (TAMR) head comprising:
   (a) a first section with a first width and a first end at a back end of a slider, the first end receives transverse electric (TE) light from an adjoining laser diode (LD), and a second end that is connected to the first end by two parallel sides which are aligned in a first axis direction that is perpendicular to an air bearing surface (ABS);
   (b) a tapered section having a first width in a cross-track direction at a first end that adjoins the second end of the first section, and a second width in a cross-track direction at a second end that faces the ABS wherein the second width is less than the first width, the tapered section narrows a beam of TE light that is propagated toward the ABS;
   (c) a first sub-section that has the second width in a cross-track direction between two sides that are aligned in the first axis direction, and a first end adjoining the second end of the tapered section;
   (d) a second sub-section that has the second width between two sides that are aligned perpendicular to the ABS, and a first end adjoining the ABS, light propagated through the second sub-section is coupled to an adjacent plasmon generator (PG); and
   (e) a light polarization rotator section for converting TE light from the first sub-section into transverse magnetic (TM) light which enters the second sub-section and is then coupled to the PG, comprising:
      (1) a first end adjoining a second end of the first sub-section;
      (2) a second end adjoining an end of the second sub-section that faces away from the ABS;
      (3) a vertical side formed between a top surface and a bottom surface; and
      (4) a sloped side formed between the top surface and the bottom surface wherein the top and bottom surfaces are coplanar with a top and a bottom surface of each of the first section, tapered section, and first and second sub-sections.

2. The waveguide of claim 1 wherein the light polarization rotator section has a length L that is equal to a half beating length of two orthogonal fundamental modes and is expressed as $L=\lambda/[2(n1-n2)]$ where $\lambda$ is the wavelength of the LD light in free space, and n1 and n2 are an effective mode index of a first and a second orthogonal fundamental mode, respectively.

3. The waveguide of claim 1 wherein the sloped side and the bottom surface of the light polarization rotator section form an angle of about 45 degrees.

4. The waveguide of claim 1 wherein the light polarization rotator section has a cross-sectional shape in the form of a trapezoid wherein a width of the top surface is less than a width of the bottom surface in a cross-track direction.

5. The waveguide of claim 4 wherein the light polarization rotator section is formed along a center plane in the first axis direction, the center plane bisects the first section, tapered section, and the first and second sub-sections, and the vertical side is formed coplanar with an adjacent side of the first sub-section and with an adjacent side of the second sub-section.

6. The waveguide of claim 1 wherein a length of the first section along the first axis direction is from 0 to about 50 microns, and a length of the tapered section along the first axis direction is about 30 to 100 microns.

7. The waveguide of claim 1 wherein the light polarization rotator section has a curved shape formed proximate to one side of a center plane aligned in the first axis direction, the center plane bisects the first section and tapered section, comprising:
   (a) a first linear section aligned in a cross-track direction and with an end adjoining the second end of the first sub-section;
   (b) a second linear section formed parallel to the first linear section and adjoining the second sub-section at an end opposite the ABS; and
   (c) a curved section formed between the first linear section and the second linear section.

8. The waveguide of claim 1 wherein the second sub-section with a second width has a lengthwise dimension along the first axis direction of about 2 to 50 microns.

9. The waveguide of claim 5 wherein the sloped side of the light polarization rotator section is offset by a first distance from a first side of the second sub-section, and the vertical side is offset by a second distance from a second side of the second sub-section such that each of the first and second offsets shorten a width of the light polarization rotator bottom surface in the cross-track direction.

10. The waveguide of claim 1 wherein the light polarization rotator section has a symmetrical triangular shape wherein a height of the vertical side in a down-track direction equals the width of the bottom surface to enable essentially 100% conversion of TE light to TM light.

11. The waveguide of claim 9 wherein the light polarization rotator section has a symmetrical five sided shape wherein the first distance offset forms a vertical fifth side between the sloped side and bottom surface such that a width of the top surface in a cross-track direction equals a height of the vertical fifth side in a down-track direction, and a height of the vertical side in a down-track direction equals a width of the bottom surface in a cross-track direction.

12. A thermally assisted magnetic recording (TAMR) head comprising:
   (a) a waveguide formed between an air bearing surface (ABS) and a back end of a slider, comprising:
      (1) a first section with a first width and a first end at a back end of the slider, the first end receives a beam of TE light from an adjoining laser diode (LD), and a second end that is connected to the first end by two parallel sides which are aligned in a first axis direction that is perpendicular to the ABS;
      (2) a tapered section having a first width in a cross-track direction at a first end that adjoins the second end of the first section, and a second width in a cross-track direction at a second end that faces the ABS wherein the second width is less than the first width, the tapered section narrows the LD light beam as the light propagates toward the ABS through the waveguide;
      (3) a first sub-section that has the second width in a cross-track direction between two sides that are aligned perpendicular to the ABS, and a first end adjoining the second end of the tapered section;
      (4) a second sub-section that has the second width between two sides that are aligned perpendicular to the ABS, and a first end adjoining the ABS, light propagated through the second sub-section is coupled to an adjacent plasmon generator (PG); and
      (5) a light polarization rotator section for converting TE light entering from the first sub-section into TM light that exits into the second sub-section, the light polarization rotator section has a vertical side that connects a top surface to a bottom surface, and a sloped side which is formed between the top and bottom surfaces; and
   (b) the PG which couples TM light from the second sub-section to a plasmon mode that is propagated along a PG surface to an end of the PG at the ABS and then onto a magnetic medium to enable a weaker magnetic field from a write pole to switch a bit in the magnetic medium during a write process; and
   (c) the write pole that adjoins the PG and has a lengthwise dimension along the first axis direction.

13. The TAMR head of claim 12 wherein the light polarization rotator section is further comprised of a first end adjoining a second end of the first sub-section, and a second end adjoining an end of the second sub-section that faces away from the ABS, and wherein the top and bottom surfaces are coplanar with a top and a bottom surface of each of the first section, tapered section, and first and second sub-sections.

14. The TAMR head of claim 12 wherein the waveguide is comprised of $Ta_2O_5$, $HfO_2$, or Si, and adjoins a plurality of cladding layers made of one or more of alumina, silicon oxide, and silicon nitride.

15. The TAMR head of claim 12 wherein the PG is separated from the second waveguide sub-section by a gap distance of about 10 to 100 nm.

16. The TAMR head of claim 12 wherein the PG has a lengthwise dimension in the first axis direction that is less than a lengthwise dimension of the second sub-section in the first axis direction.

17. The TAMR head of claim 12 wherein the light polarization rotator section has a length L along the first axis direction that is equal to a half beating length of two orthogonal fundamental modes and is expressed as $L=\lambda/[2(n1-n2)]$ where $\lambda$ is a wavelength of the LD light in free space, and n1 and n2 are an effective mode index of a first orthogonal fundamental mode and a second orthogonal fundamental mode, respectively.

18. The TAMR head of claim 12 wherein the sloped side and the bottom surface of the light polarization rotator section form an angle of about 45 degrees.

19. The TAMR head of claim 12 wherein the light polarization rotator section has an irregular trapezoid shape wherein a width of the top surface is less than a width of the bottom surface in a cross-track direction.

20. The TAMR head of claim 12 wherein the light polarization rotator section is formed along a center plane in the first axis direction, the center plane bisects the first section, tapered section, and the first and second sub-sections, and the vertical side is formed coplanar with an adjacent side of the first sub-section and with an adjacent side of the second sub-section.

21. The TAMR head of claim 12 wherein a length of the first section along the first axis direction is from 0 to about 50 microns, and a length of the tapered section along the first axis direction is about 30 to 100 microns.

22. The TAMR head of claim 12 wherein the light polarization rotator section has a curved shape formed proximate to one side of a center plane aligned in the first axis direction, the center plane bisects the first section and tapered section, and the curved shape comprises:
   (a) a first linear section aligned in a cross-track direction and with an end adjoining a second end of the first sub-section;
   (b) a second linear section formed parallel to the first linear section and adjoining the second sub-section at an end opposite the ABS; and
   (c) a curved section formed between the first linear section and the second linear section.

23. The TAMR head of claim 20 wherein the sloped side of the light polarization rotator section is offset by a first distance from a first side of the second sub-section, and the vertical side is offset by a second distance from a second side of the second sub-section such that each of the first and second offsets shorten a width of the light polarization rotator bottom surface in the cross-track direction.

24. The TAMR head of claim 12 wherein the light polarization rotator section has a symmetrical triangular shape wherein a height of the vertical side in a down-track direction equals a width of the bottom surface to enable essentially 100% conversion of TE light to TM light.

25. The TAMR head of claim 23 wherein the light polarization rotator section has a symmetrical five sided shape wherein the first distance offset forms a vertical fifth side between the sloped side and bottom surface such that a width of the top surface in a cross-track direction equals a height of the vertical fifth side in a down-track direction, and a height of the vertical side in a down-track direction equals a width of the bottom surface in a cross-track direction.

\* \* \* \* \*